United States Patent

[11] 3,549,170

[72] Inventor Robert F. Shankwitz
 Oswego, Ill.
[21] Appl. No. 778,224
[22] Filed Nov. 22, 1968
[45] Patented Dec. 22, 1970
[73] Assignee Caterpillar Tractor Co.
 Peoria, Ill.
 a corporation of California

[54] SUPPORT STRUCTURE FOR PROTECTION CANOPY/CAB
 5 Claims, 4 Drawing Figs.
[52] U.S. Cl. .................................................. 280/150,
 296/102
[51] Int. Cl. .................................................. B60j 7/24
[50] Field of Search .......................................... 296/28.21,
 102; 280/150C

[56] References Cited
 UNITED STATES PATENTS
2,769,501 11/1956 Wagner ..................... 296/28(X)
2,805,887 9/1957 Selby ........................ 296/102
3,036,858 5/1962 Fingerut .................... 296/102
3,203,728 8/1965 Wood ........................ 296/102
3,380,774 4/1968 Broderson et al. ......... 296/102

Primary Examiner—Benjamin Hersh
Assistant Examiner—Leslie J. Paperner
Attorney—Fryer, Tjensvold, Feix, Phillips & Lempio ABSTRACT: A support structure for mounting a protection canopy or cab on an earthmoving vehicle, wherein the rear support member is a welded structure consisting of legs integrally connected by a crossbeam and the front support member comprises fabricated brackets with a crossmember therebetween. Plates are welded to the front and rear support members for fixing the support members to the vehicle and the cab. The support members also carry brackets for mounting equipment such as hydraulic and fuel tanks thereon.

INVENTOR
ROBERT F. SHANKWITZ

SUPPORT STRUCTURE FOR PROTECTION CANOPY/CAB

SUMMARY OF THE INVENTION

During the past several years several states have passed regulations requiring operator protection canopies on earthmoving equipment. These requirements state that the protection canopy must be secured to the vehicle main frame, or its equivalent.

Many of the currently available wheel loaders, however, were designed prior to enactment of those regulations and no mounting structure was provided thereon. In order to provide protection canopies for such vehicles it is necessary to provide mounting brackets which are secured to the main frame. Such brackets may not interfere with existing components but must be attached in a structurally sound location which will also provide convenient installation and removal of the canopy.

In view of these requirements it is therefore an object of this invention to provide a support means for vehicle canopies or/and cabs.

It is also an object of this invention to provide such a support means which may be utilized on vehicles originally manufactured without provision for mounting a canopy or cab thereon.

It is also an object of this invention to provide such a support means whereby the canopy or cab may be conveniently attached to and removed from such a vehicle.

It is a still further object of this invention to provide such a support means whereby a canopy or cab is attached to a vehicle in a location providing convenient installation and removal of the canopy or cab.

Other objects and advantages of the present invention will become apparent from the following description and claims as illustrated in the accompanying drawings which, by way of illustration, show a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

DETAILED DESCRIPTIONS OF THE DRAWINGS

Figure 1:
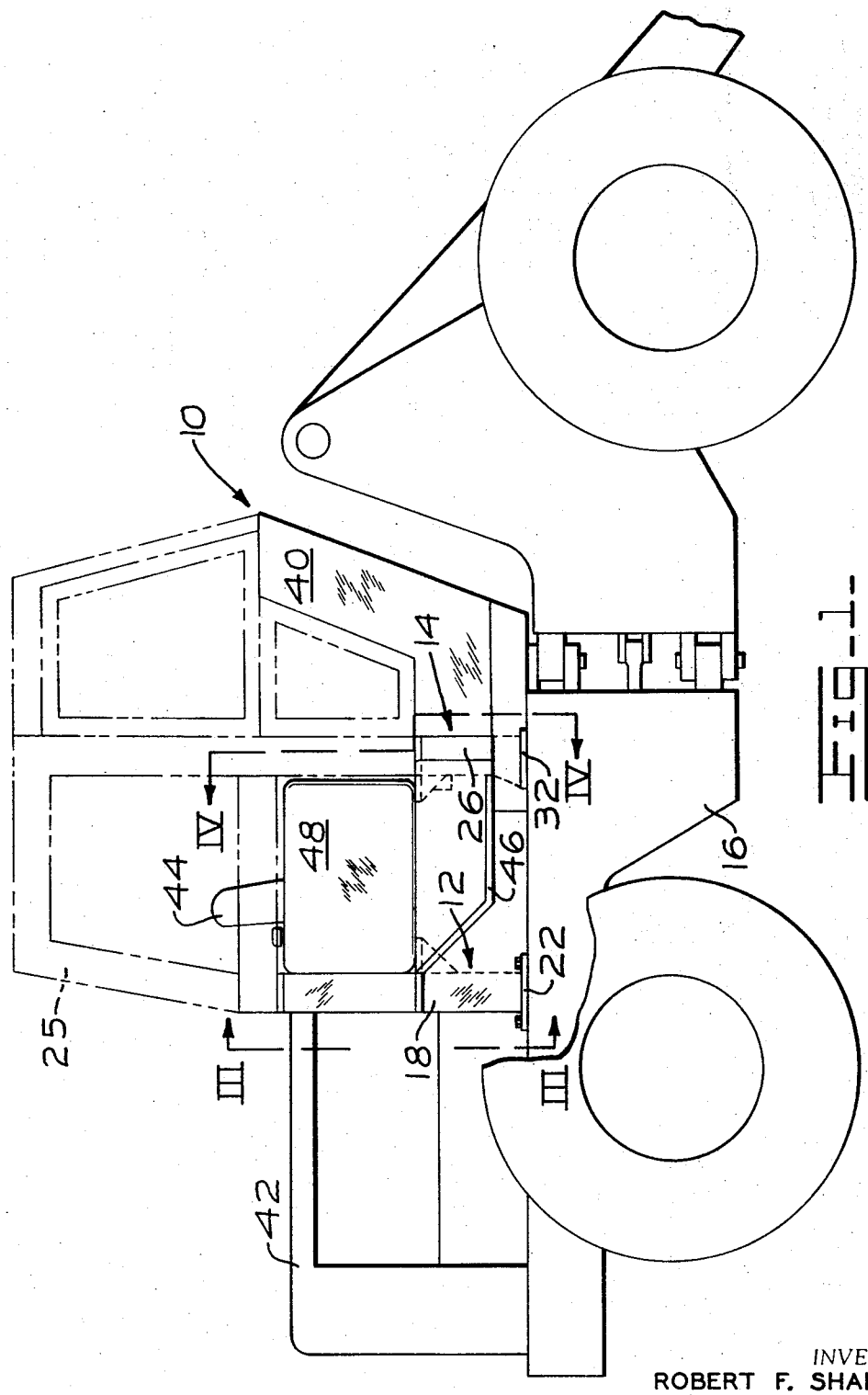
FIG. 1 is a side, schematic illustration of an earthmoving machine utilizing the present invention.

Referring now to the drawings in greater detail, there is shown in FIG. 1 a vehicle, generally indicated at 10, having mounted thereon a rear support member 12 and a front support member 14, which are secured to the vehicle frame 16.

Figure 2:
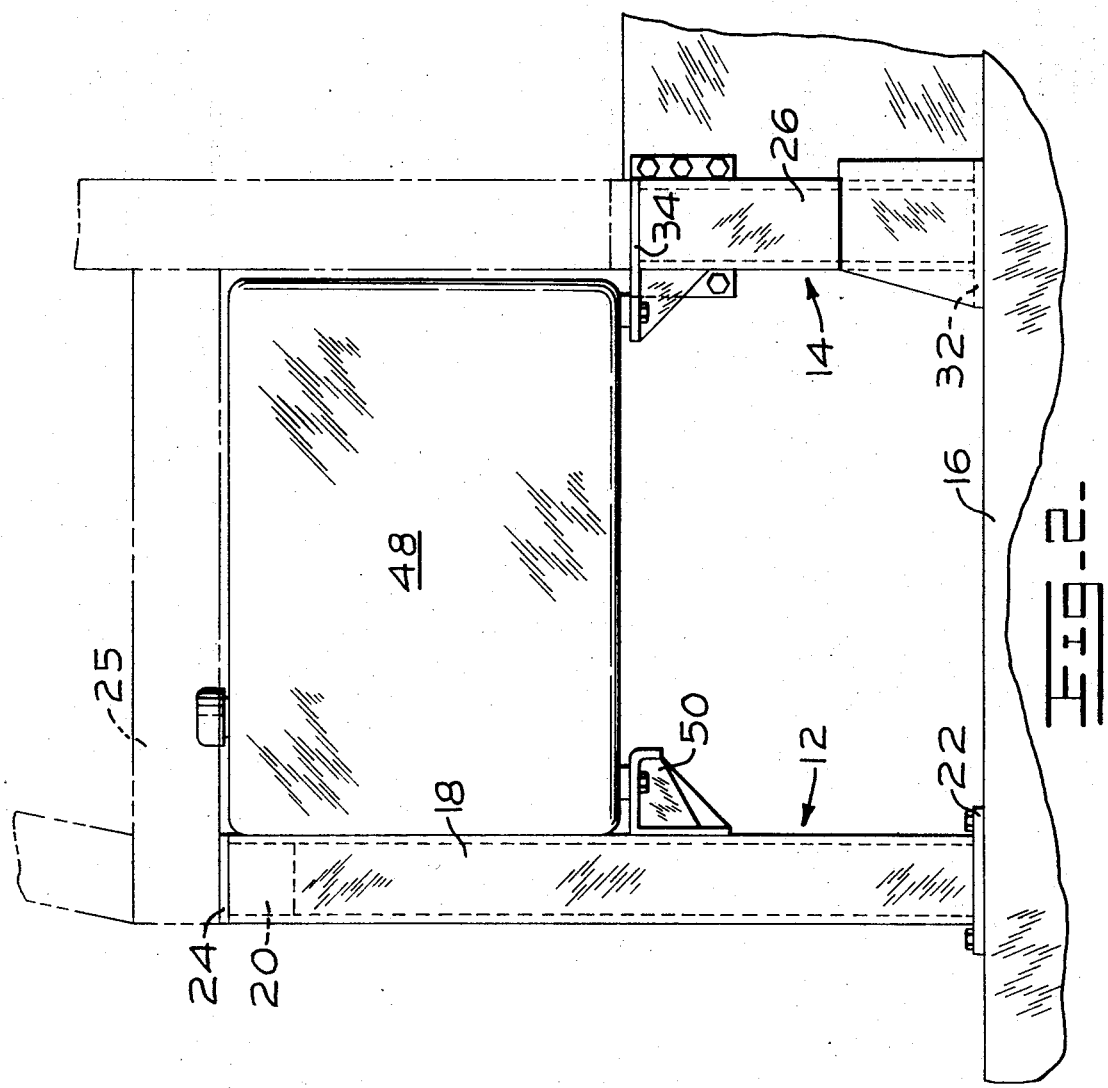
FIG. 2 is an enlarged view of the support structure shown in FIG. 1 with portions of the vehicle deleted so as to more clearly illustrate structural relationships.
Figure 3:
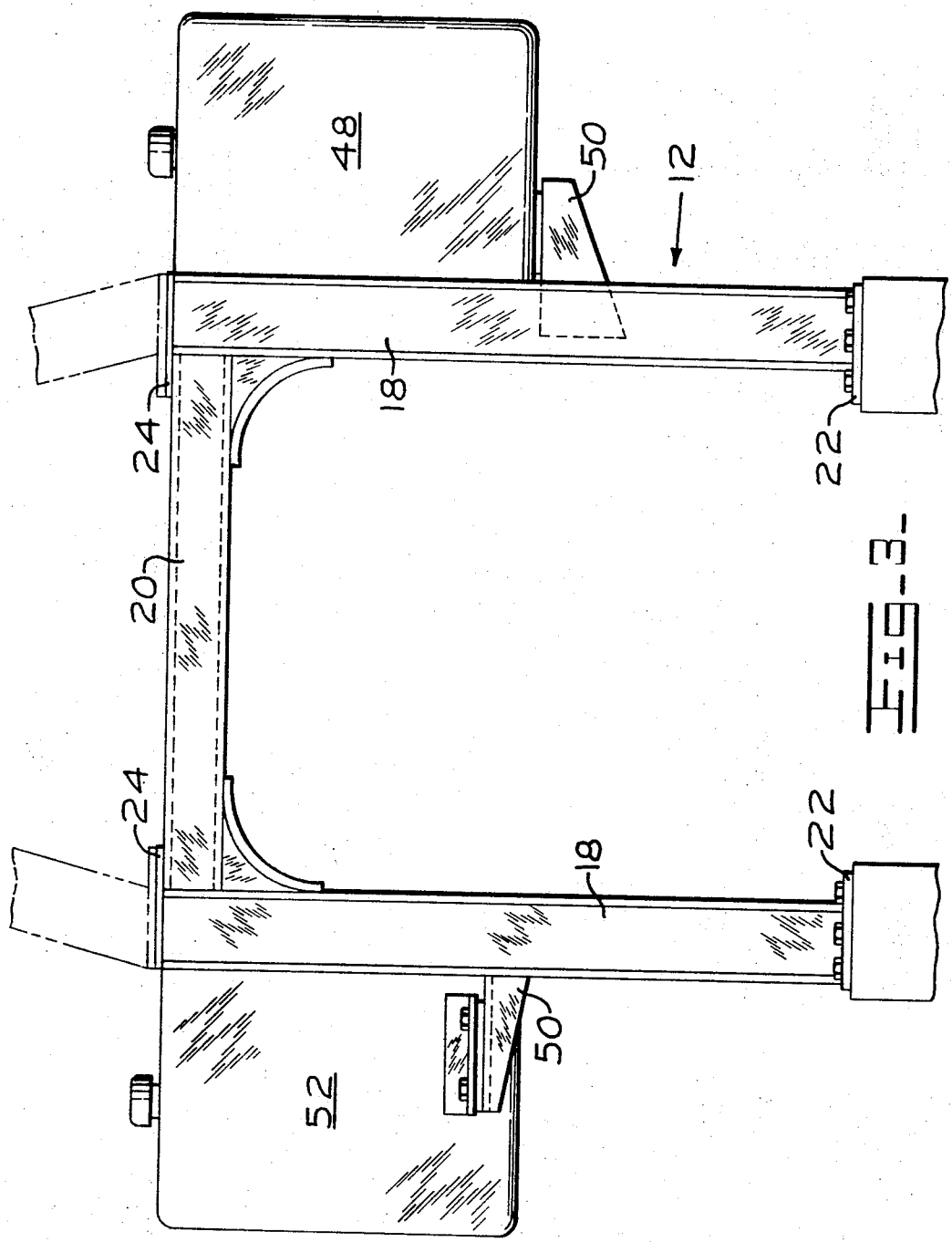
FIG. 3 is a view of the support means of the instant invention taken along line III–III of FIG. 1.

As more clearly shown in FIGS. 2 and 3, the rear support member 12 comprises a welded structure formed by legs 18, integrally connected by a crossbeam 20 welded therebetween. The legs 18 and crossbeam 20 are box sections constructed from channels. Plates 22, welded to the bottom of the legs 18, provide mounting means to secure the support member 12 to the frame 16. Plates 24, welded to the tops of the legs, provide mounting pads to which the protection canopy or cab 25 may be secured.

Figure 4:
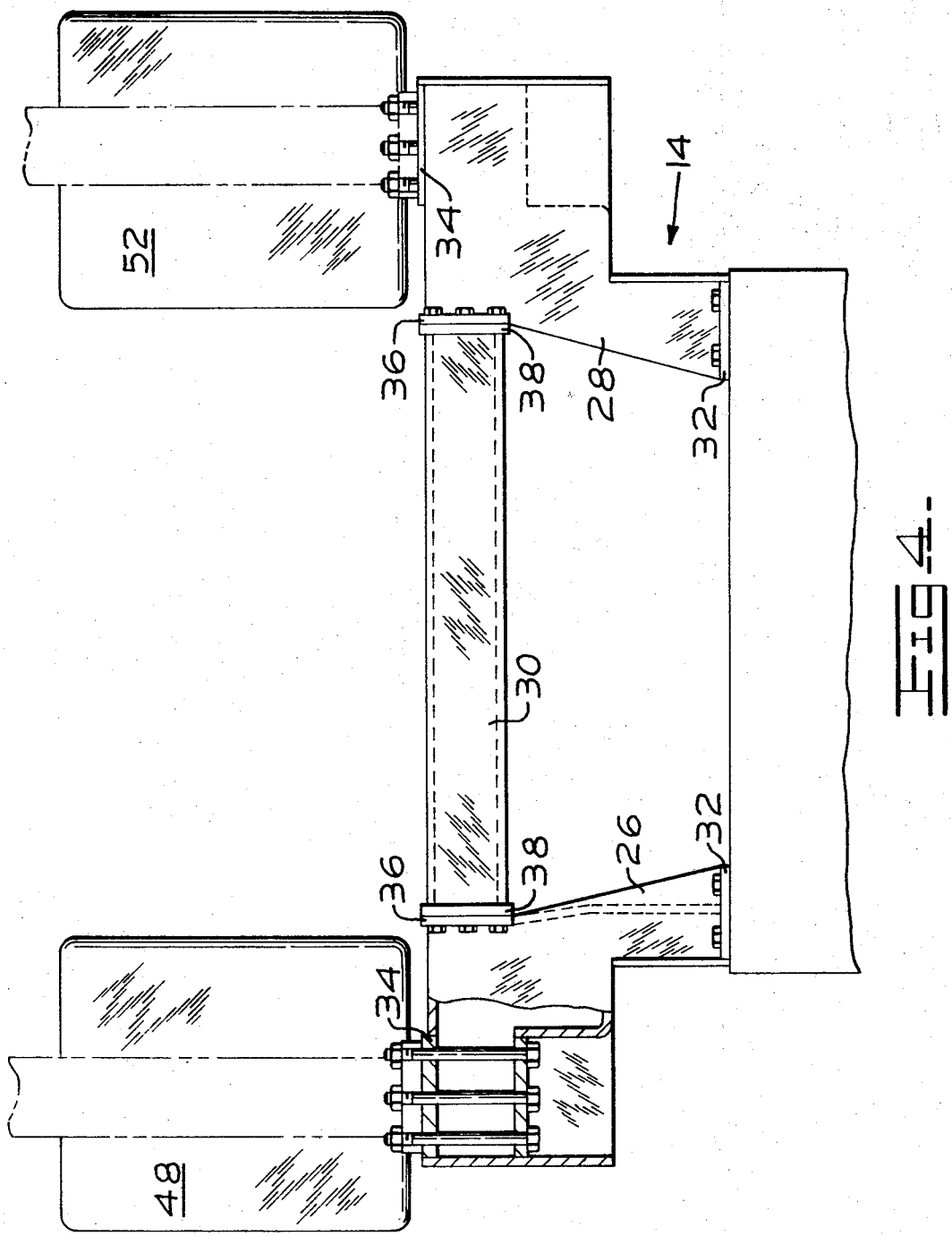
FIG. 4 is a front view of the support structure of the invention taken along a line IV–IV in FIG. 1.

As shown in FIGS. 3 and 4, the front support member 14 comprises of pair of brackets 26 and 28 having a channel crossmember 30 connected therebetween. Each of the brackets 26 and 28 is a fabricated structure, comprises of several formed plates welded together. This produces both strength and desired shape. At the bottoms of the brackets, plates 32 have been welded thereon to secure the support member 14 to the vehicle frame. Plates 34, welded to the tops of the brackets, provide a front-mounting surface for the canopy. A plate 36 is also mounted on each of the brackets so as to provide a suitable connection surface with the channel 30, via plates 38 which have been welded on the ends thereof.

In this way, the applicant has provided a suitable means for mounting a protection canopy or cab upon a vehicle. Of course, the support means may also be used to support other vehicle components. For example, a console 40 may be secured to the front of the support member 14 and the vehicle frame 16, and the rear support member 12 may also be utilized to carry the engine hood 42, a seat 44, and one or more fenders 46.

A tank 48 may be supported by a bracket 50 welded to a leg 18 and also by the pad 34 on the front support 36. A second tank 52 may be similarly mounted on the opposite side of the support structure and one tank may be used as a hydraulic tank and the other as a fuel tank.

As disclosed, the support members are secured to the main frame to provide a suitable mounting for the protection canopy or cab and may be included as an integral part of a vehicle design. Thus, installation of a protection canopy or cab can be made with no modifications to the vehicle. Further, by designing the front-mounting pads so as to extend above the floor decking and the rear-mounting pads so as to extend above the hydraulic and fuel tanks, the protection canopy may be easily installed or removed during shipping, etc.

Thus the applicant has provided an improved support structure which is inexpensive and of sufficient strength to provide safety to a vehicle operator. While illustrated and described in a single preferred embodiment, the invention is capable of variation and modification, as will be obvious to those skilled in the art, within the purview of the following claims.

I claim:

1. A protective cab support structure for a vehicle comprising a rear member and a front member, said rear member comprising a pair of vertical legs interconnected at the upper ends thereof by a horizontal crossbeam fixed therebetween, said front member comprising a pair of vertical brackets, said brackets being interconnected by a horizontal crossmember fixed therebetween at the upper ends thereof and first horizontal pads at the lower ends of said legs and brackets for fixing the structure to the vehicle and second horizontal pads at the upper ends of said legs and brackets for fixing the protective cab to the support structure, said legs and brackets having means thereon to support vehicle components, said vehicle components comprising substantially closed containers extending between said last mentioned means on said legs and brackets.

2. The support of claim 1 wherein said containers are tanks adapted to receive fluid.

3. The support of claim 1 wherein said brackets are fabricated from several formed plates so as to provide strength and shape thereto.

4. The support of claim 1 wherein the legs are of a different height than the brackets.

5. The support of claim 1 wherein said legs and crossbeam are box portions constructed from channels.